United States Patent [19]

Roosen et al.

[11] Patent Number: 5,462,822
[45] Date of Patent: Oct. 31, 1995

[54] PHOTOGRAPHIC PRINT MATERIAL SUITED FOR THE PRODUCTION OF A MULTICOLOUR LIQUID CRYSTAL DISPLAY

[75] Inventors: Raymond Roosen, 's-Gravenwezel; Herman Van Gorp, Tielen; Marcel Monbaliu, Mortsel, all of Belgium

[73] Assignee: AGFA-GEVAERT N. V., Mortsel, Belgium

[21] Appl. No.: 197,879

[22] Filed: Feb. 17, 1994

[30] Foreign Application Priority Data

Mar. 11, 1993 [DE] Germany ............ 93 20 0707.3

[51] Int. Cl.$^6$ .............. G03C 9/00; C09K 19/02
[52] U.S. Cl. ............ 430/7; 430/20; 430/394; 430/396; 359/68
[58] Field of Search .......... 430/20, 7, 394, 430/396; 359/68

[56] References Cited

U.S. PATENT DOCUMENTS 4,610,509  9/1986  Sorimachi et al. ............ 350/350

FOREIGN PATENT DOCUMENTS

| 0396824 | 11/1990 | European Pat. Off. . |
| 88155 | 4/1973 | Japan ............ 359/68 |
| 0045226 | 3/1986 | Japan ............ 359/68 |
| 0140923 | 6/1986 | Japan ............ 359/68 |

OTHER PUBLICATIONS

English translation of J61/140923, Jul. 1986.

Primary Examiner—Lee C. Wright
Attorney, Agent, or Firm—William J. Daniel

[57] ABSTRACT

A photographic print material suited for the production of a multicolor filter array element for use in a liquid crystal display device including a liquid crystal layer wherein the print material comprises a glass plate supporting on one side thereof (i) a silver halide emulsion layer sensitive to blue light and containing a yellow dye forming color coupler, (ii) a silver halide emulsion layer sensitive to green light and containing a magenta dye forming color coupler, and (iii) a sliver halide emulsion layer sensitive to red light and containing a cyan dye forming color coupler. The red light sensitive emulsion layer is disposed on the side of the array remote from the glass supporting plate and in each of the silver halide emulsion layers the equivalent ratio of silver halide to color coupler is at least 1 and preferably 1.2. A water-impermeable organic resin covering layer is applied over the red light sensitive emulsion layer and a transparent electrode layer is vacuum deposited over the covering layer. In the liquid crystal display device, the filter array element is arranged with its glass plate opposite from the liquid crystal layer.

4 Claims, 1 Drawing Sheet

PHOTOGRAPHIC PRINT MATERIAL SUITED FOR THE PRODUCTION OF A MULTICOLOUR LIQUID CRYSTAL DISPLAY

FIELD OF THE INVENTION

This invention relates to a photographic material suitable for use in the production of a multicolor filter array element, to such element and a multicolor liquid crystal display device incorporating such element.

BACKGROUND OF THE INVENTION

Liquid crystal display devices are used nowadays in numerous applications such as clocks, household appliances, electronic calculators, audio equipment, etc. There is a growing tendency to replace cathode ray tubes by liquid crystal display devices being favoured for their smaller volume and lower power consumption. In some applications like e.g. laptop computers and pocket TV's liquid crystal display devices are even without competition.

High definition television in its ultimate version will require screen diagonals exceeding 50 inch (see P. Plezhko in the periodical Information Display September 1991, Vol. 7 no. 9, p. 19 a.f.). Although not yet in existence CRT-based 50 inch screens can be expected to be very impractical because of their weight and size. Liquid crystal technology is basically able to produce high definition television (HDTV) screens with moderate weight and size.

Liquid crystal display devices generally include two spaced glass panels, which define a sealed cavity, which is filled with a liquid crystal material. The glass plates are covered with a transparent electrode layer which may be patterned in such a way that a mosaic of picture elements (pixels) is created.

Full color reproduction is made possible by the use of a color filter array element inside the liquid crystal display device.

Two addressing systems are used to drive the display : either a passive system or an active system.

According to the passive system in the liquid crystal device the 2electrode layers are patterned in a regular array of stripes. The stripes on one plate are perpendicular to those on the other plate.

The application of a voltage across two opposing stripes causes a change in the optical properties of the liquid crystal material situated at the crossing point of the two stripes, resulting in a change of the light transmission through the energized picture element called pixel.

According to the active system, which greatly improves the performance of the liquid crystal display device, each pixel has its own individual microelectronic switch, which means that such a microswitch is connected to an individual transparent pixel electrode, the planar size of which defines the size of the pixel. The microswitches are individually addressable and are three-terminal or two-terminal switching elements.

Three-terminal switches are formed by thin film transistors (TFT). These transistors are arrayed in a matrix pattern on a glass plate which together with a glass plate carrying a transparent uniform (non-patterned) electrode layer forms a gap filled with the liquid crystal material.

With a diode or a similar two-terminal switching device the transparent electrode layer must be patterned.

To impart color reproduction capability to the liquid crystal display device a color filter array element is provided on one of the two glass plates. In an active matrix display, examples of which are described in U.S. Pat. Nos. 5,081,004 and 5,003,302, this is usually the glass plate opposite the glass plate carrying the switching elements.

A color filter array for full color reproduction consists of red, green and blue patches arranged in a given order. For contrast improvement the color patches may be separated by a black contour line pattern delineating the individual color pixels (ref. e.g. U.S. Pat. No. 4,987,043).

In order to prevent loss of effective voltage over the liquid crystal material the color filter is preferably kept out of the electrical circuit which means that the transparent electrode is deposited on top of the color filter array element.

Several techniques for making color filter array elements have been described in the prior art.

A first widely used technique operates according to the principles of photolithography (ref. e.g. published EP-A 0 138 459) and is based on photohardening of polymers e.g. gelatin. Dichromated gelatin, doped with a photosensitizer is coated on glass, exposed through a mask, developed to harden the gelatin in the exposed areas and washed to remove the unexposed gelatin. The remaining gelatin is dyed in one of the desired colors. A new gelatin layer is coated on the dyed relief image, exposed, developed, washed and dyed in the next color, and so on. By that wash-off and dying technique 4 complete operation cycles are needed to obtain a red, green and blue color filter array having the color patches delineated with a black contour line. As an alternative dyeable or colored photopolymers are used for producing superposed colored photoresists. In the repeated exposures a great registration accuracy is required in order to obtain color filter patches matching the pixel-electrodes.

In a modified embodiment of said photoresist technique organic dyes or pigments are applied by evaporation under reduced pressure (vacuum evaporation) to form a colored pattern in correspondence with photoresist openings [ref. Proceedings of the SID, vol. 25/4, p. 281–285, (1984)]. As an alternative a mechanical precision stencil screen has been used for patternwise deposition by evaporation of dyes onto a selected substrate (ref. e.g. Japan Display 86, p. 320–322.

According to a second technique dyes are electrodeposited on patterned transparent electrodes from a dispersion of curable binder polymers, dispersing agents and colored pigments. For each color a separate deposition and curing step is needed.

According to a third technique said red, green and blue dyes are deposited by thermal transfer from a dye donor element to a dye-receiving element, comprising a transparent support, e.g. glass plate, having thereon a dye-receiving layer. Image-wise heating is preferably done by means of a laser or a high intensity light flash. For each color a separate dye transfer step must be carried out.

According to a fourth technique as described e.g. in U.S. Pat. No. 4,271,246 a method of producing a multicolor optical filter comprises the steps of (1) exposing a photographic material comprising a support and a single, i.e. one, black-and-white silver halide emulsion layer to light through a first pattern; (2) developing the exposed emulsion layer with a first coupler-containing color developer to form a pattern of a first dye; then (3) exposing an unexposed portion of said emulsion layer to light through a second pattern; (4) developing the exposed area with a second coupler-containing color developer to form a pattern of a second dye; (5) repeating exposure and development to form patterns containing dyes of third and optionally subsequent colors, thereby to form color patterns of at least two colors; and subjecting the product to a silver removal treatment after the final color development step.

All the above described techniques have in common that they require at least three (four if the black contour pattern requires a separate step) treatment steps, and some of them require very costly exposure apparatuses to reach the desired level of registration.

By the large number of production steps and the required accuracy the manufacturing yields, i.e. the percentage of the color filter array elements made in the factory which meet quality control standards are exceptionally low.
The very costly investments could be brought down when the filter production could be simplified and yet high quality maintained.

When using a multilayer color photographic silver halide material for multicolor filter production comparable to color print film used in the motion picture film industry the above mentioned problems related to image registration and large number of processing steps can be avoided. From one color negative an unlimited number of color positives on film can be produced at a very high rate. Only one exposure for each positive is needed. A great number of exposed positives can be chemically treated at the same time in the same machine. This makes the whole process very attractive from the viewpoint of yield and investment. Such process operating with a negative color image as original to form a complementary color pattern on a glass substrate has been described already in published Japanese patent application (Kokai) 60-133427.

Published European patent application 0 396 824 relates to a process for the production of a multicolor liquid crystal display device comprising a liquid crystal layer essentially consisting of nematic crystals in twisted or supertwisted configuration or smectic C (chiral smectic) ferroelectric liquid crystals wherein the liquid crystal molecules are aligned in such a way that said layer shows an electrically controllable rotation of the polarization plane of the light incident on the display. Said liquid crystal layer together with a multicolor filter element is arranged between front and rear transparent electrodes for altering pixelwise the electric field over the liquid crystal layer and said electrodes are associated respectively with a front and rear light polarizer element. Said process comprises in consecutive order the steps of:

(1) providing a photographic print material that contains on a glass support a plurality of differently spectrally sensitive silver halide emulsion layers, (2) subjecting said print material to a single step multicolor pixelwise exposure, (3) color processing said exposed print material producing thereby in each silver halide emulsion layer a differently colored pixel pattern, (4) coating said color processed print material at its silver halide emulsion layer assemblage side with a hydrophobic water-impermeable organic resin layer, and (5) depositing by vacuum-coating one of said electrodes on said organic resin layer serving as a covering layer for said silver halide emulsion layer assemblage.

So, before introducing said multicolor filter in the liquid crystal device the uppermost emulsion layer of the thus processed photographic print material is coated with a hydrophobic water-impermeable organic resin to form a covering layer of said resin thereon, and by vacuum-deposition on top of the thus-applied resin coating a transparent electrically conducting (electrode) layer is formed.

Said resin layer on top of the color filter array provides a good planarity and prevents the release of volatile substances from the emulsion layer during vacuum-deposition, e.g. by sputtering, of the transparent conducting layer. Usually a bake at 150° C. or even higher is needed to impart by curing a good impermeability to the resin layer.

In liquid crystal displays of the so-called twisted nematic (TN) type (as are the majority of active matrix liquid crystal displays) the transparent uniformly applied electrode and also the patterned electrode are covered with an alignment layer. This layer usually consists of a heat-cured polyimide resin. Rubbing this cured layer with e.g. a nylon cloth (ref. e.g. GB-P 1,505,192) in a given direction causes an orientation of the liquid crystal molecules near the surface of the layer in the rubbing direction.

From the preceding it is clear that the multicolor filter array element is subjected to rather severe heat treatment steps during the manufacture of the liquid crystal display element. These heating steps should not give rise to discoloration of the filter and dye fading.

Most dyes formed by a reaction based on the coupling of color formers with oxidized color developer of the p-phenylenediamine type have rather limited resistance to high temperatures and tend to become yellowish or brownish, while the blues turn to dark grey.

It has been established experimentally by us that thermal degradation of color filters made by means of a multilayer color photographic silver halide material incorporating color couplers is attributed to two simultaneously occurring phenomena, i.e. breakdown of one or more of the composing dyes and coloration of the residual normally colorless color couplers still present in the processed layers.

The major contribution to coloration (yellowish or brownish) of color filters prepared by silver halide color photography based on color coupling comes from the magenta-forming color couplers of the pyrazolone type, which is representative of nearly all of the magenta color couplers used in modern color photographic materials. Furthermore said color couplers can react with magenta dyestuffs derived from them thereby causing loss of magenta dye. (P. W. Vittum and F. C. Duennebier, J. Am. Chem. Soc., 72, 1536 (1950)) Apart from this particular phenomenon the breakdown of dyes is primarily determined by their structure.

It is generally known that from the 3 dyestuff types (yellow, magenta and cyan) produced on color coupling with p-phenylene diamine type developers the cyan dyes are the most susceptible to break down under thermal constraints, and that therefore thermal stability of the color filter as a whole can be much improved by the choice of the cyan dye forming coupler. Examples of cyan-forming color couplers having a particularly good stability against light, heat and humidity are described in U.S. Pat. No. 4,342,825 and EP 0 269 766.

Since the dyes are formed in a coupling reaction between a color coupler and the color developing substance in its oxidized form, the structure of the color developing substance is decisive also for the dye-stability. In most embodiments of color development by means of color couplers p-phenylenediamine type developing agents are used. In published EP application 0 459 210 derivates of p-phenylenediamine yielding dyestuffs with improved fastness to light are described. Such color developing substances are therefore advantageously used in the production of color filters subjected lateron to radiation and/or thermal treatment.

OBJECTS AND SUMMARY OF THE INVENTION

It is an object of the present invention to provide a photographic material suited for a simplified production of a multicolor filter useful in the manufacture of a multicolor liquid crystal display device (multicolor LCD) which manufacture includes high temperature treatment steps that by the structure of said photographic material do not substantially affect the color quality of said multicolor filter.

It is a further object of the present invention to provide a multicolor filter array element firmly associated with a transparent electrode layer in a multicolor liquid crystal display device., e.g. a multicolor active matrix LCD.

It is an other object of the present invention to provide a process for the manufacture of a multicolor liquid crystal display device comprising a multicolor filter array element firmly associated with a transparent electrode layer.

Other objects and advantages will become clear from the accompanying drawing, description and examples which are not limitative to the scope of the present invention.

In accordance with the present invention a photographic print material suited for the production of a multicolor filter array element is provided, wherein said material comprises on a glass support (i) a silver halide emulsion layer sensitive to blue light and containing a yellow dye forming color coupler, (ii) a silver halide emulsion layer sensitive to green light and containing a magenta dye forming color coupler, (iii) a silver halide emulsion layer sensitive to red light and containing a cyan dye forming color coupler, wherein said layer (iii) is most remote from said support and in each silver halide emulsion layer the equivalent ratio of silver halide to color coupler is at least 1.

Further in accordance with the present invention a multicolor filter array element suitable for use in the production of a multicolor liquid crystal display device is provided, wherein said element comprises on a glass support a pixelwise exposed and processed multicolor silver halide layer assemblage containing in a processed blue sensitive emulsion layer yellow pixels, in a processed green-sensitive emulsion layer magenta pixels, and containing cyan pixels in a processed red-sensitive emulsion layer which is the emulsion layer most remote from the glass support, and which pixels in superposition according to the principles of subtractive color photography yield a color matrix (mosaic) of blue, green and red pixels optionally said pixels being delineated with a black contour line (grid pattern), and wherein said emulsion layer containing cyan pixels is coated with an organic resin to form a waterimpermeable covering layer, which covering layer for curing purposes has been thermally treated at a temperature in the range of 50° to 200° C., and wherein on top of the thus treated resin layer a transparent electrode layer is present, that is coated with a resinous alignment layer.

Still further in accordance with the present invention a process is provided for the manufacture of a multicolor liquid crystal display device comprising in a sealed gap between glass plates, each provided with an electrode or electrode structure, a liquid crystal layer consisting essentially of liquid crystals imparting to said layer an electrically controllable rotation of the polarization plane, which process comprises the following steps (A), (B) and (C) for the production of a multicolor filter array element to be incorporated in said device:

(A) exposing a photographic silver halide print material in order to obtain therein after color development according to the principles of subtractive color formation a color matrix (mosaic) containing blue, green and red patches or stripes, optionally separated by black contour lines, said photographic print material comprising a glass support carrying on one of its sides an assemblage of waterpermeable hydrophilic colloid layers comprising: (i) a silver halide emulsion layer being sensitive to blue light and containing a yellow dye forming color coupler, (ii) a silver halide emulsion layer sensitive to green light and containing a magenta dye forming color coupler, (iii) a silver halide emulsion layer sensitive to red light and containing a cyan dye forming color coupler, wherein in each silver halide emulsion layer the equivalent ratio of silver halide to color coupler is at least 1;

(B) subjecting the thus-exposed silver halide emulsion layer assemblage to photographic color-development to create in said blue sensitive emulsion layer yellow pixels, in the green-sensitive emulsion layer magenta pixels, and in the red-sensitive emulsion layer cyan pixels, which pixels in superposition according to the principles of subtractive color photography yield a color matrix (mosaic) of blue, green and red pixels, optionally separated by black contour lines, and (C) removing from said layer assemblage any residual silver halide and image silver by bleaching and fixing followed by rinsing and drying; and (D) before introducing said multicolor filter array element in the liquid crystal device the uppermost emulsion layer of the thus processed photographic print material is coated with an organic resin to form a waterimpermeable covering layer, which covering layer for curing purposes is thermally treated at a temperature in the range of 50° to 200° C., and (E) on top of the thus treated resin layer a transparent electrode layer is formed, whereupon said electrode layer is coated with a resinous alignment layer, and (F) a light polarizer element is disposed on each exterior side of said glass plates.

Preferably the alignment layer, which is coated on said transparent conducting electrode layer is cured also at elevated temperature.

DESCRIPTION OF THE DRAWING

A preferred print material for use in the production of a multicolor filter array according to the present invention is illustrated in the accompanying drawing which represents a schematic cross-sectional view of its multilayer structure. In said structure element 1 represents a transparent glass plate that may be coated with a subbing layer not shown in the drawing. Element 2 is a yellow antihalation layer which can be decolorized during the wet photographic processing [step (C)]. Element 3 represents a blue-sensitive silver halide emulsion layer containing a yellow-forming coupler. Element 4 represents a gelatin interlayer containing a compound capable of scavenging oxidized color developing agent. Element 5 represents a silver halide emulsion layer the silver halide of which is made sensitive to green light and contains a magenta-forming coupler. Element 6 represents a gelatin interlayer containing a compound capable of scavenging oxidized color developing agent. Element 7 represents a silver halide emulsion layer the silver halide of which is made sensitive to red light and contains a cyan-forming coupler.

DETAILED DESCRIPTION OF THE INVENTION

Figure 1:
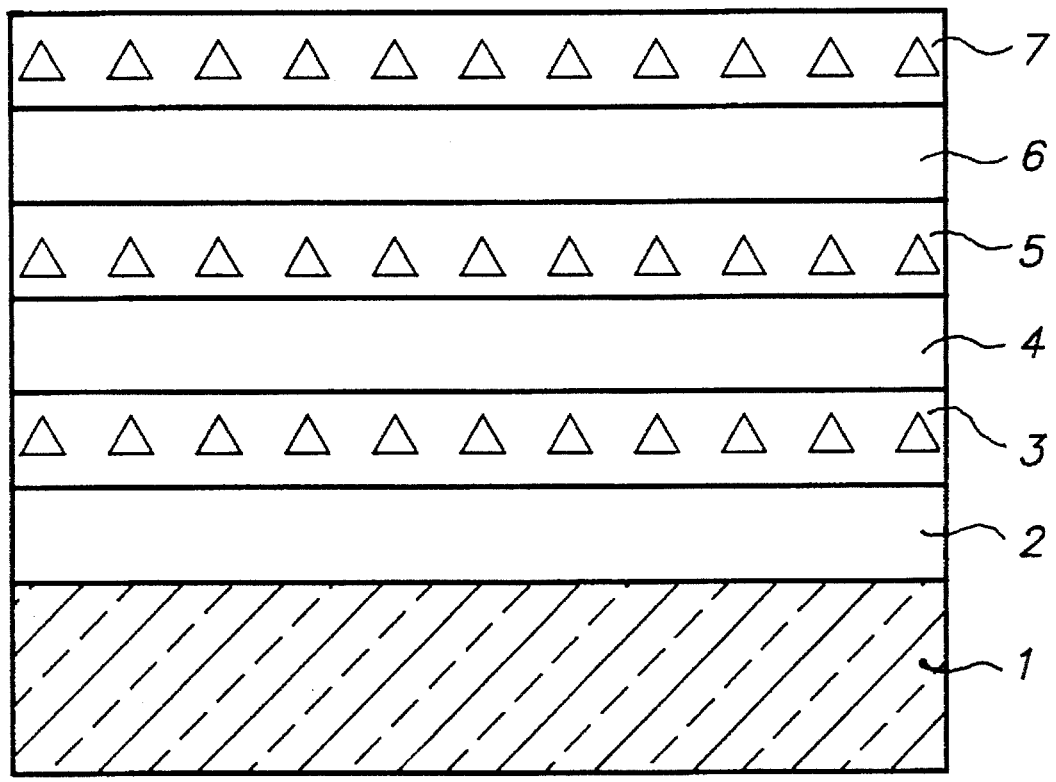

It has been established experimentally by comparative tests that the color-processed silver halide emulsion layer containing the cyan dye image maintains much better its hue and density when present as remote as possible from the glass support which is heated in a baking step to cure said heat-curable resin topcoat.

The stability of the magenta dye is not impaired by having the color-processed magenta dye containing layer nearest to the glass substrate.

Preferably the coverage of the magenta forming color coupler is such that the color density obtainable therewith by means of an oxidized p-phenylene diamine type color developer is not higher than 2.5 in order to avoid yellowing of the whites in the heat-treatment.

However, the improvement in color stability is not solely due to said particular silver halide emulsion layer sequence but also due to the fact that in each silver halide emulsion layer the silver halide is used in an amount at least chemically equivalent with each color coupler whereby the development process after pixelwise exposure does not leave or only in very small coverage leaves a color coupler that may give rise to unwanted coloration on heating.

The amount of color coupler needed to obtain an optical density not higher than 2.5 at the maximum of spectral absorption of the dye formed can be determined by simple tests.

The amount of silver halide present in each color coupler containing layer is adjusted preferably in such a way that in the pixelwise exposed regions forming a halftone image, i.e. in the dotwise exposed regions, the color coupler is completely converted to dye during the color development. This means that the equivalent ratio of silver halide to color coupler in the print material should be preferably 10% higher than 1.

A ratio of 1 in equivalent amounts means that for each mole of color coupler present in the layer 4 or 2 moles of silver halide are added, depending on whether the color coupler is of the 4- or the 2- equivalent type.

In the transformation of one mole of a 4-equivalent color coupler into one mole of dye, 4 moles of oxidized color developer are involved, which means that 4 moles of silver halide must be reduced. In the case of a 2-equivalent color coupler only 2 moles of silver halide are needed for a complete conversion.

In current color print films the amount of color coupler and the silver halide/color coupler ratio strongly deviate from the above described ratio because they serve quite different purposes, viz. they serve for continuous tone reproduction in which an excess of color coupler is preferred for speeding up color development and obtaining maximum densities more than 3.

In order to inhibit the diffusion of oxidized developing agent into neighbouring silver halide emulsion layers said layers are separated by an intermediary water-permeable colloid layer, e.g. gelatin-containing layer, comprising a scavenging agent for oxidized developing agent. Suitable scavenging agents for that purpose are diffusion-resistant hydroquinone derivatives, preferably containing one or more aliphatic ballast groups having at least 6 carbon atoms. Such scavenging agents and their use are described e.g. in DE-P 3 545 611.

The silver halide emulsion layer may contain any type of light-sensitive silver halide emulsion, e.g. an emulsion that forms a latent image primarily on the surfaces of the silver halide grains, or that form an internal latent image predominantly in the interior of the silver halide grains. The emulsions can be negative-working emulsions, e.g. surface-sensitive emulsions or unfogged internal latent image-forming emulsions, or positive-working emulsions e.g. direct-positive emulsions of the unfogged, internal latent image-forming type, the development of which is conducted with uniform light exposure or in the presence of a nucleating agent. Further are mentioned direct-positive emulsions of the pre-fogged type wherein during image-wise exposure chlorine, bromine and/or iodine is liberated which image-wise destroys the developable centres created during overall prefogging. Direct-positive emulsions need only one development (as do negative emulsions).

Reversal silver halide emulsions are not prefogged. Their processing includes 2 development steps and a fogging step. The first development is carried out with a black-and-white developer whereby a negative black-and-white silver image is formed. The remaining silver halide is made developable by fogging, either physically (by exposure to light) or chemically. Upon subsequent color development, bleaching and fixing a positive color image is obtained.

By negative-working is meant that the density observed after processing is proportional to the exposure. By positive-working is meant that the silver halide emulsions yield upon exposure and development positive images, i.e. the density is inversely proportional to the exposure.

The applied silver halide can be of the silver chloride, the silver chloride-bromide, the silver bromide, the silver bromide-iodide or the silver chloride-bromide-iodide type.

The silver halide can be surface sensitized. Noble metal (e.g. gold), middle chalcogen (e.g. sulfur, selenium or tellurium), and reduction sensitizers, employed individually or in combination, are specifically contemplated. Typical chemical sensitizers are listed in Research Disclosure December 1989, item 308119, section III.

The silver halide can be spectrally sensitized with dyes from a variety of classes, including the polymethine dye class, which includes the cyanines, merocyanines, complex cyanines and merocyanines (i.e. tri-, tetra-, and polynuclear cyanines and merocyanines) oxonols, hemioxonols, styryls, merostyryls, and streptocyanines; see said Research Disclosure, section IV.

Suitable vehicles for the emulsion layers and other layers of the print material are described in section IX of said Research Disclosure and brighteners and antifoggants are described respectively in sections V and VI, and hardeners for gelatin in section X.

As already mentioned hereinbefore color filters for liquid cristal displays normally comprise a repeating pattern of colored patches as in a mosaic pattern or may form a pattern of stripes. The colored patches are preferably separated by a black contour line, which according to the present invention is formed by superposed area of the different emulsion layers wherein on color-development cyan, magenta and yellow dye is formed respectively.

In the exposure of the multilayer silver halide color material light passing through the silver halide emulsion layers will be reflected by the transparent glass substrate back into the multilayer arrangement. Hereby a halo impairing sharpness of the resulting image is formed. To prevent this usually a light-absorbing layer is coated on the rear side of a color print film. This commonly carbon black containing layer is removed during processing in a step preceeding the proper color development. The use of such layer is not appropriate in the case of the production of color filters. Not only is it rather inconvenient to coat layers on both sides of a glass plate but moreover during the removal of such back layer from the glass plate particles coming from this layer may adhere to the front layer making the color filter useless.

According to a preferred embodiment the reflections from the glass plate back into the multilayer arrangement are eliminated by the presence of a light-absorbing (anti-halation) layer between the glass substrate and the first photographic silver halide emulsion layer. This anti-halation layer must lose its light-absorbing properties during or after processing and become as clear as possible. To this end one or more dyes are present in said layer which dyes should be destroyed chemically in one or more processing liquids or simply be soluble in one or more of the processing liquids or in the rinse water and be washed out. It is advantageous to use anti-halation dyes of the non-diffusing type, i.e. dyes that are insoluble in water and do not migrate to adjacent layers during manufacture. Such is important when the dyes, due to their spectral or other properties, can change the photographic properties of the adjacent silver halide emulsion layers.

Yellow dyes of the non-diffusing type that may serve in decolorizable anti-halation layers for use in a multicolor print material according to the present invention as illustrated in the accompanying drawing are described in U.S. Pat. No. 4,770,984.

Filter or anti-halation dyes may be present in one or more layers of the multilayer arrangement to decrease unwanted interlayer reflections and/or to improve the optical characteristics of individual layers. This practice is well known to those skilled in the art.

The multilayer arrangement of hydrophilic colloid (gelatin containing) layers of the present multicolor print material must stick very firmly to the glass substrate. The glass used for the substrate is e.g. borax glass, borosilicate glass, lime glass, potash glass, soda glass, crown glass, flint glass, silica-flint glass, chromium glass, zinc-crown glass or quartz glass. The glass support has e.g. a thickness in the range of 0.5 to 1.5 mm.

The so-called subbing layers currently used in color print film on a resin support cannot be used due to the very different nature of the glass substrates.

A strong adhesion of the hydrophilic colloid multilayer arrangement to the glass support can be realized by means of a very thin subbing layer containing gelatin, a water-soluble inorganic silicon compound like e.g. sodium silicate (water glass) and a gelatin hardening agent.

An equally strong adhesion can be obtained without a subbing layer by the addition to the first layer, which in a preferred embodiment is a gelatin-containing light-absorbing anti-halation layer, of an organic silicon compound such as an epoxysilane and a hardening agent for gelatin.

When said layer after being freshly coated is treated at a temperature in the range of 34° to 40° C. and at a relative humidity in the range of 70 to 85% the adhesion of said subbing layer towards a gelatin-containing layer such as a gelatin-silver halide emulsion layer is much improved. Particularly suitable subbing layers on the basis of organic silicon compounds are described in U.S. Pat. No. 3,661,584 and GB-P 1,286,467.

The pixelwise exposure of the multicolor print material according to the present invention can be performed in several ways.

For example, the exposure may proceed in a single step through a multicolor master, in a plurality of steps with light of different color (blue, green and red) through a pitchwise shiftable black-and-white mask or simultaneously or subsequently by means of pixelwise modulated laser beams of different color, blue, green and red.

A convenient method for manufacturing the color filters for use according to the present invention, especially in mass-production when a great number of them is needed, is to carry out the exposure in a single step through a multicolor master.

When used in conjunction with a negative type multilayer silver halide color material the master must be a colored negative master, whereas a colored positive master is needed when a direct positive or reversal type multilayer silver halide color material is involved.

A colored negative master has predominantly yellow-, magenta- and cyan colored pixels at the places corresponding respectively with the blue, green and red pixels on the color filter array element.

In said single step exposure using a white light source the colored master is in close or near contact with the multilayer silver halide color material from which a color filter is to be made, the gelatin layers of both materials facing each other. By said single step exposure simultaneously latent images in the 3 light-sensitive differently spectrally sensitive silver halide emulsion layers are formed.

Deviation from the desired spectral transmission characteristics of the filter area may be corrected by inserting in the white light beam filters changing the proportion of red, green and blue transmitted by the multicolor master.

The negative and positive masters may be made by means of other recording materials than silver halide emulsion type materials.

For example, the multicolor master may be made by photolithography, vacuum-deposition or electrodeposition of dyes, thermal transfer of dyes, electro(photo)graphy with colored toner or inkjet printing with colored inks.

After processing the silverhalide color filter is covered with a protective resin layer which in the production of a multicolor filter associated with an electrode layer has to be present.

Since gelatin is an hydrophilic polymer it contains still a small amount of water even after thorough drying. Minor quantities of water may not be allowed to enter the liquid crystal cell since they profoundly disturb the operation of the liquid cristal display. Moreover, during the application of the electrode layer by vacuum-deposition water or other volatile substance may not be allowed to escape from the gelatin-containing layers and has to be kept blocked by a protective impermeable resin layer on top of the uppermost color-developed silver halide emulsion layer of the color filter. In the manufacture of a liquid crystal display according to the present invention heat-curable resins are used for producing said impermeable layer.

Examples of heat-curable organic resins and curing agents therefor are described by Ernest W. Flick in "Handbook of Adhesive Raw materials"—Noyens Publications—Park Ridge, N.J., USA (1982). Polyimide resins that can be heat-cured are e.g. the photo-curable polyimide resins disclosed in U.S. Pat. No. 4,698,295. Further are mentioned epoxy resins that can be heat-cured with amines thermally set free from an amine precursor e.g. ketimine which on reacting with water yields an amine [ref. The Chemistry of Organic Film Formers by D. H. Solomon, John Wiley & Sons, Inc. (1967), p.190].

The water-impermeable hydrophobic organic resin layer may be coated from a liquid composition containing (an) evaporatable solvent(s) or may be applied onto the processed multicolour material by lamination using e.g. a heat-curable layer sandwiched originally between a polyethylene film and a protective cover sheet analogously to the type of material described in J. photogr. Sci., 18, 150 (1970).

The wet strength of the color processed gelatin containing silver halide emulsion layer assemblage before coating with the organic resin layer in step (4) of the present invention statement can be greatly improved as described in published EP-A 0 396 824 by a treatment with an aqueous composition containing the self-cross-linking reaction product of:

(i) an epihalohydrin or an Alpha-dihalohydrin, (ii) a water-soluble polyamide, and (iii) a water-soluble polyamine containing at least two nitrogen atoms separated by at least three carbon atoms and optionally also by at least one oxygen or sulphur atom and having at least two hydrogen atoms attached to different nitrogen atoms. Said self-cross-linking reaction product may form itself a water-impermeable hydrophobic organic resin layer serving as covering layer or as subbing layer for another outermost water-impermeable organic resin layer.

The preparation of the above defined self-cross-linking reaction product is given in GB-P 1 269 381, wherein said product is described for improving the wet strength of paper.

A transparent conductive layer forming the electrode layer is applied to the impermeable resin layer by known techniques, e.g. a transparent indium tinoxyde (ITO) layer is applied by vacuum-deposition.

Although the multicolor filter array elements prepared according to the present invention are very well suited for the production of active matrix liquid cristal displays there use is not restricted to that type of displays. They can be incorporated likewise in passive matrix liquid cristal displays, especially in supertwisted nematic (STN), double supertwisted nematic (DSTN), retardation film supertwisted nematic (RFSTN), in ferroelectric (FLC), guest host (GH), polymerdispersed (PF), polymer network (PN) liquid cristal displays, and so on. They can further be incorporated in emissive displays like electroluminescent displays, CRT devices and in charge coupled device (CCD) cameras.

The following examples illustrates the present invention without however limiting it thereto.

EXAMPLE 1 (comparative example)

Multilayer color material A (non-invention material)

On a sodalime glass support with a thickness of 1.5 mm the following layers were coated.

Blue sensitive layer

A 100% silver chloride emulsion wherein the silver chloride grains had an average size of 0.4 μm was coated onto said glass support at a coverage of silver chloride equivalent with 0.68 g of $AgNO_3$ per $m^2$.

Before coating the blue sensitivity of the silver chloride was increased with a spectral sensitizing agent according to structural formula SB defined furtheron.

The coating composition contained a yellow dye forming coupler according to structural formula Y1 in an amount sufficient for a coverage of 1.5 g per $m^2$.

Further the coating composition contained an amount of gelatin sufficient for a coverage of 2.5 g per $m^2$.

Red sensitive layer

Onto the blue sensitive layer a red sensitive silver halide emulsion layer was applied wherein the silver halide consisted of silver chloride-bromide (90/10 molar ratio) with grains having an average size of 0.12 μm. The silver halide was applied at a coverage of silver halide equivalent with 0.64 g of $AgNO_3$ per $m^2$.

Before coating the silver chloride-bromide grains were sensitized spectrally to red light with a spectral sensitizing agent according to structural formula SR defined furtheron.

The coating composition contained a cyan dye forming coupler according to structural formula C1 in an amount sufficient for a coverage of 1.65 g per $m^2$.

Further the coating composition contained an amount of gelatin for a coverage of 2.5 g per $m^2$.

Green sensitive layer

Onto the red sensitive layer a green sensitive silver halide emulsion layer was applied wherein the silver halide consisted of silver chloride-bromide (90/10 molar ratio) with grains having an average size of 0.12 μm. The silver halide was applied at a coverage of silver halide equivalent with 0.64 g of $AgNO_3$ per $m^2$. Before coating the silver chloride-bromide grains were sensitized spectrally to green light with a spectral sensitizing agent according to structural formula SG defined furtheron.

The coating composition contained a magenta dye forming coupler according to structural formula M1 in an amount sufficient for a coverage of 1.65 g per $m^2$ and hydroxy-dichloro-triazine as hardening agent in an amount sufficient for a coverage of 0.035 g per $m^2$.

Further the coating composition contained an amount of gelatin for a coverage of 1.5 g per $m^2$.

Multilayer color material B (invention material)

The 3 light-sensitive silver halide emulsion layers of material B were identical to those of material A with the proviso that the sequence of the red and the green sensitive layers was switched, i.e. the green sensitive layer was coated onto the blue sensitive layer and the red sensitive layer was coated onto the green sensitive layer.

Exposure

The materials A and B were given a red light exposure sufficient to produce by the color processing as described hereinafter a cyan patch with a density to red light of 3.0.

After exposure each trilayer multicolor material was treated for 5 minutes at 20° C. with the following developing composition:

| | |
|---|---:|
| Sodium sulphite (anhydrous) | 4 g |
| 2-amino-5-diethylamino-toluene hydrochloride | 3 g |
| sodium carbonate (anhydrous) | 17 g |
| sodium bromide | 1.7 g |
| sulphuric acid 7 N | 0.62 ml |
| water up to | 1000 ml |

Thereupon each material was treated in an acid stop bath prepared by adding water up to 1 1 to 50 ml of sulphuric acid 7N. The treatment with stop bath was followed by 2 minutes rinsing in plain water followed by a 2 minutes fixing in an aqueous solution having the following composition:

| | |
|---|---|
| 58% aqueous solution of $(NH_4)_2S_2O_3$ | 100 ml |
| sodium sulphite (anhydrous) | 2.5 g |
| sodium-hydrogen sulphite (anhydrous) | 10.3 g |
| water up to | 1000 ml |

The treatment with fixing liquid was followed by a 2 minutes rinsing in plain water followed by a 3 minutes bleaching in an aqueous solution having the following composition:

| | |
|---|---|
| potassium hexacyanoferrate (III) (anhydrous) | 30 g |
| sodium bromide (anhydrous) | 17 g |
| water up to | 1000 ml |

Thereupon the material was treated with the fixing liquid again and rinsed for 3 minutes with plain water.

Finally the material was treated with an aqueous solution having a pH of 9 and containing per liter 20 ml of a 40% aqueous solution of formaldehyde serving as hardening agent.

The structural formulae of the compounds used are given below.

Spectral sensitizing agents

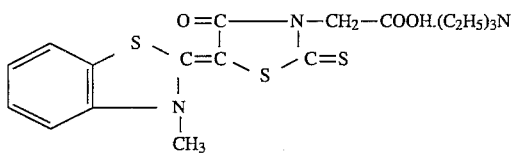
SB

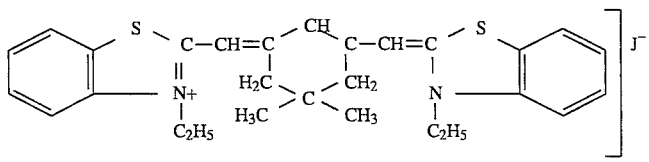
SR

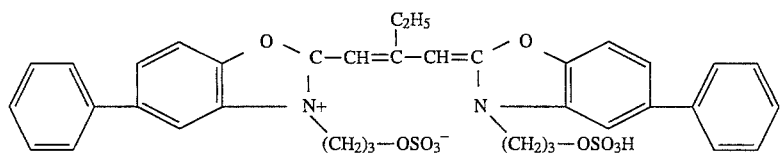
SG

Color couplers

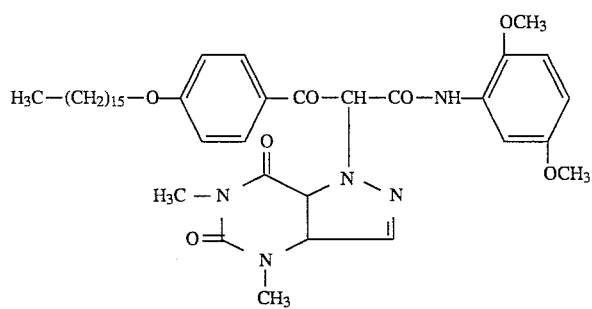
Y1

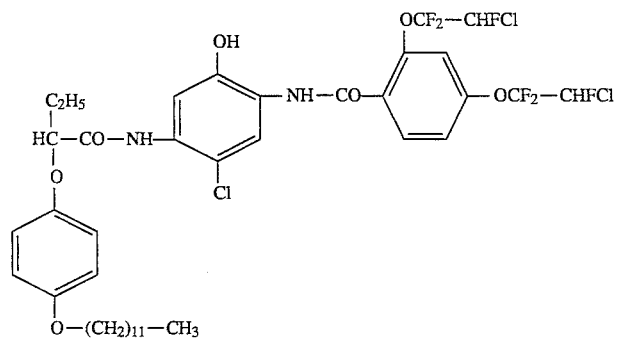
C1

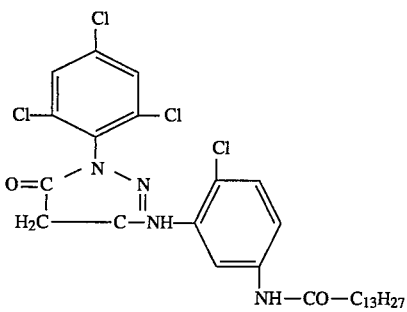

M1

The cyan colored test samples of both materials exposed and processed as described above, having a density to red light of 3.0 were submitted to a heat treatment at 200° C. during 30', 60' and 90'. The density losses, expressed as percentages of the initial density, are given in the following Table 1.

TABLE 1

| Material | 30' | 60' | 90' |
|---|---|---|---|
| A | −22% | −35% | −61% |
| B | −8% | −16% | −30% |

EXAMPLE 2 (comparative example)

Non-invention Material A
The non-invention material A contains three lightsensitive silver halide emulsion layers, the composition of which is given hereafter. The amounts of silver halide are expressed as the equivalent amount of silver nitrate.
Blue sensitive layer
A 100% silver chloride emulsion with an average grain size of 0.4 μm was sensitized to blue light with a spectral sensitizing agent of formula SB. A yellow dye forming coupler of formula Y1 was added to this emulsion.
The amounts of silver halide, gelatine and color coupler Y1 were 1.2, 3.0 and 2.0 g/m² respectively.
Red sensitive layer
A silver chloride-bromide (90/10 molar ratio) emulsion with an average grain size of 0.12 μm was sensitized to red light with a spectral sensitizing agent of formula SR.
A cyan dye forming coupler of formula C2 was added to this emulsion. The amounts of silver halide, gelatin and color coupler C2 were 0.64, 4.0 and 1.7 gr/m² respectively.
Green sensitive layer
A silver chloride-bromide (90/10 molar ratio) emulsion with an average grain size of 0.12 μm was sensitized to green light with a spectral sensitizing agent of formula SG.
A magenta dye forming coupler of formula M1 was added to this emulsion.
The amounts of silver halide, gelatin and color coupler M1 were 0.49, 2.0 and 0.75 gr/m² respectively.
These layers were coated in the order given on sodalime glass with a thickness of 1.5 mm, that has previously been covered with a subbing layer containing 0.12 g gelatin/m², 0.16 g of sodium silicate and 0.24 g/m² of chromium acetate.
Yellow, magenta and cyan water-soluble dyes, acting as accutance dyes were present in suitable amounts and 0.035 g/m² of hydroxytrichlorotriazine acting as an hardening agent.
Invention Material B
Material B (invention material) had 3 more layers than material A i.e. an anti-halation layer and two intermediate layers. The composition of said layers of material B was as follows:
Anti-halation layer
A non-diffusing yellow dye of formula YD, was dispersed in gelatin. To this dispersion epoxysilane E (structure defined hereinafter) acting as an adhesion promoter was added.
The coverages of yellow dye YD, gelatin and epoxysilane E were 0.5, 1.5 and 0.1 g/m² respectively.
Blue sensitive layer
A 100% silverchloride emulsion with an average grain size of 0.4 μm was sensitized to blue light with a spectral sensitizing agent of formula SB. A yellow dye forming coupler of formula Y1 was added to this emulsion.
The amounts of silverhalide, gelatine and color coupler Y1 were 0.57, 3.30 and 1.0 g/m² respectively.
First intermediate layer
A substance of formula SD, capable of scavenging oxidized color developing agent was dispersed in gelatin and coated at a coverage of 0.08 g SD/m² and of 0.77 g gelatine/m².
Green sensitive layer
A silver chloride-bromide (90/10 molar ratio) emulsion with an average grain size of 0.12 μm was sensitized to green light with a spectral sensitizing agent of formula SG. A magenta dye forming coupler of formula M1 was added to this emulsion.
The amounts of silver halide, gelatin and color coupler M1 were 0.71, 2.8 and 0.53 g/m² respectively.
Second intermediate layer
This layer has the same composition as the first intermediate layer.
Red sensitive layer
A silver chloride-bromide (90/10 molar ratio) emulsion with an average grain size of 0.12 μm was sensitized to red light with a spectral sensitizing agent of formula SR. A cyan dye forming coupler of formula C1 was added to this emulsion.
The amounts of silver halide, gelatin and color coupler C2 were 0.49, 4.5 and 0.95 g/m² respectively.
Yellow, magenta and cyan water-soluble dyes, acting as accutance dyes were present at an appropriate coverage and hydroxytrichlorotriazine acting as hardening agent was present at a coverage of 0.035 g/m².
These layers were coated in the order given on sodalime glass with a thickness of 1.5 mm. In the following Table 2 the silver halide to color coupler ratio in equivalent amounts is given for the three light-sensitive layers of both materials. The coverages of the color couplers, expressed in mmoles/m², are also given.

TABLE 2

|  | Silver halide color coupler (eq.) | mmol color coupler/m² |
|---|---|---|
| Blue sens. layer A | 1.2 | 2.8 |
| B | 1.2 | 1.4 |
| Green sens. layer A | 0.6 | 1.2 |
| B | 1.2 | 0.9 |
| Red sens. layer A | 0.5 | 3.8 |
| B | 1.3 | 1.1* |

Formulae:

Color coupler C2

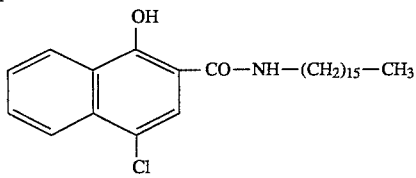

Non-diffusing yellow dye YD

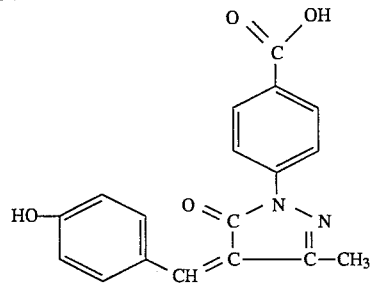

Epoxysilane E

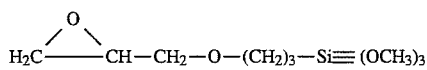

Scavenger SD

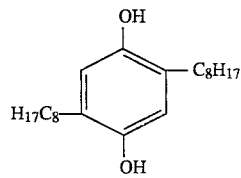

Materials A and B were exposed to blue, green and red light through a black-and-white step wedge and processed in the same way as described in Example 1.

The resulting yellow, magenta and cyan colored wedge images were subjected to a heat treatment at 180° C. for 30' and 60'. From the densities measured before and after said heat treatment the density changes expressed in percent in Table 3 were noted.

TABLE 3

| Material | % density change starting from density 2 | | | | | |
|---|---|---|---|---|---|---|
| | Yellow | | Magneta | | Cyan | |
| | ½ h | h | ½ h | 1 h | ½ h | 1 h |
| A | 0 | −3 | −3 | −8 | −69 | −81 |
| B | −8 | −12 | −2 | −4 | −6 | −10 |

The coloration to yellow-brown during the heat treatment at 180° C. can be attributed to the changes in absolute values of the densities measured with blue, green and red filter light in originally colorless parts of the test samples (see Table 4).

TABLE 4

| | Filter color | Initial density | density change after ½ h 180° C. | density change after 1 h 180° C. |
|---|---|---|---|---|
| Material A | Blue | 0.14 | +0.24 | +0.37 |
| | Green | 0.10 | +0.03 | +0.05 |
| | Red | 0.10 | −0.01 | −0.02 |
| Material B | Blue | 0.10 | +0.06 | +0.10 |
| | Green | 0.07 | +0.01 | +0.02 |
| | Red | 0.07 | 0 | 0 |

The strong coloration to yellow-brown of the colorless areas of the non-invention material A, which is largely due to the magenta color coupler, compensates to some extent for the loss of yellow dye, causing apparently smaller loss figures for the yellow patches on non-invention material A in Table 3.

The results listed in Tables 3 and 4 clearly demonstrate a substantial improvement in thermal stability that can be obtained in the production of a multicolor filter array element according to the present invention.

We claim:

1. A multicolor liquid crystal imaging device comprising in a sealed gap between glass plates, each provided with an electrode or electrode structure, a liquid crystal layer and a multicolor filter array element which comprises supported on one of said glass plates a pixelwise exposed and color-processed multicolor silver halide layer assemblage, said filter array element being arranged in said multicolor liquid crystal display device with the glass support thereof directed away from said liquid crystal layer, said assemblage containing yellow pixels in an originally before processing blue light sensitive emulsion layer (1) containing a yellow dye forming color coupler, magenta pixels in an originally before processing green light sensitive emulsion layer (2) containing a magenta dye forming color coupler, and containing cyan pixels in an originally before processing red light sensitive emulsion layer (3) containing a cyan dye forming color coupler, said layer (3) being the emulsion layer most remote from the glass plate supporting said assemblage, and which pixels are in superposition according to the principles of subtractive color photography to yield a color matrix (mosaic) of blue, green and red pixels, a thermally cured organic resin layer over said emulsion layer containing said cyan pixels to form a water-impermeable covering layer over the assemblage, the thermal curing of said resin being at a temperature in the range of 50° to 200° C., a transparent electrode layer on top of the cured resin layer, and a resinous alignment layer on top of said transparent electrode layer.

2. The multicolor liquid crystal imaging device of claim 1 wherein in each of said silver halide emulsion layers of said assemblage before processing the equivalent ratio of silver halide to color coupler is at least 1.

3. A process for the manufacture of a multicolor liquid crystal display device comprising in a sealed gap defined between glass plates, each provided with an electrode or electrode structure, a liquid crystal layer consisting essentially of liquid crystals imparting to said layer an electrically controllable rotation of the polarization plane, which process comprises the following steps:

(A) exposing a photographic silver halide print material in order to obtain therein after color development according to the principles of subtractive color formation a color matrix (mosaic) containing separate blue, green, and red patches or stripes, said photographic print material comprising a glass plate supporting on one of its sides an assemblage of water-permeable hydrophilic colloid layers comprising: (i) a silver halide emulsion layer sensitive to blue light and containing a yellow dye forming color coupler, (ii) a silver halide emulsion layer sensitive to green light and containing a magenta dye forming color coupler, and (iii) a silver halide emulsion layer sensitive to red light and containing a cyan dye forming color coupler, wherein said red light sensitive emulsion layer (iii) is most remote from said glass plate supporting said assemblage (B) subjecting the thus-exposed silver halide emulsion layer assemblage to photographic color development to create in said blue-sensitive emulsion layer yellow pixels, in the green-sensitive emulsion layer magenta pixels, and in the red-sensitive emulsion layer cyan pixels, which pixels are in superposition according to the principles of subtractive color photography to yield a color matrix of blue, green, and red pixels, optionally separated by black contour lines; and (C) removing from said layer assemblage any residual silver halide and image silver by bleaching and fixing followed by rinsing and drying; and (D) coating the uppermost emulsion layer of the thus processed photographic print material with an organic resin to form a water-impermeable covering layer, and then curing the thus-coated layer by thermal treatment at a temperature in the range of 50° to 200° C., and (E) forming on top of the thus thermally-treated resin layer a transparent electrode layer, and then coating said electrode layer with a resinous alignment layer, (F) introducing the resultant multicolor filter array element in the liquid crystal display device with the glass plate thereof remote from the liquid crystal layer of the device and forming one of said glass plates defining said gap; and (G) arranging a light polarizer element on each exterior side of said glass plates defining said gap.

4. The process of claim 3 wherein in each of said silver halide emulsion layers of said assemblage before processing the equivalent ratio of silver halide to color coupler is at least 1.

* * * * *